United States Patent [19]

Taniguchi et al.

[11] 4,120,734
[45] Oct. 17, 1978

[54] MONOLITHIC REFRACTORY COMPOSITIONS

[75] Inventors: Taizo Taniguchi; Itsutoshi Iwasaki, both of Kita-kyushu; Toshihiko Takeshige, Shimonoseki; Koji Onizuka; Soichi Hashiguchi, both of Kita-kyushu, all of Japan

[73] Assignee: Taiko Rozai Co. Ltd., Japan

[21] Appl. No.: 849,531

[22] Filed: Nov. 8, 1977

[30] Foreign Application Priority Data

Nov. 26, 1976 [JP] Japan .............................. 51/142509

[51] Int. Cl.$^2$ .............................................. C04B 35/66
[52] U.S. Cl. ......................................... 106/67; 106/68
[58] Field of Search ..................................... 106/67, 68

[56] References Cited

U.S. PATENT DOCUMENTS 2,613,153  10/1952  Stafford .................................. 106/67
2,881,083  4/1959  Veale .................................... 106/67

Primary Examiner—James Poer

Attorney, Agent, or Firm—Wenderoth, Lind & Ponack

[57] ABSTRACT

This invention relates to monolithic castable refractory compositions for lining various smelting furnaces and other industrial furnaces, molten metal containers and the like, and to the preparation of such compositions and the products obtained from them. These compositions comprise the following ingredients:

| | |
|---|---|
| refractory clay: | 3 – 12% by weight |
| metallic aluminum powder (purity = 90% or higher; particle size = 0.074 mm or less for 50% or more by weight of the aluminum powder): | 0.1 – 5.0% by weight |
| deflocculating agent: | 0.01–1.0% by weight |
| coagulant: | 1–8% by weight |
| reaction inhibitor for aluminum powder: | to be added optionally in a quantity from 0.0 to 0.5% by weight |
| refractory aggregates with particle sizes adjusted: | balance |

1 Claim, No Drawings

MONOLITHIC REFRACTORY COMPOSITIONS

DETAILED EXPLANATION OF THE INVENTION

This invention relates to monolithic refractory compositions for lining various smelting and other industrial furnaces, molten metal containers and the like. The purpose of this invention is to provide monolithic refractory compositions for casting, which contain refractory clay as a binder, and do not suffer explosive spalling or flaking, even when subjected to rapid heat-drying after casting.

The conventional monolithic refractory compositions for casting, in general, have mainly comprised hydraulic castable refractory material having alumina cement as a binder. This type of hydraulic castable refractory compositions has several disadvantages, because of the presence of alumina cement in a quantity of 10% or more by weight, in that its hot properties are poor in a high temperature zone of 1200° C. or higher and that its strength is remarkably deteriorated by dehydration in a middle temperature zone of 800°–1000° C.

In order to remove such disadvantages, a variety of castable refractory compositions having a deflocculating agent and coagulant added and having refractory clay as a binder have recently been developed. This group of castable refractory compositions is more satisfactory with regard to hot properties, i.e., refractoriness, spalling resistance, hot strength, volume stability and the like in comparison with the conventional hydraulic castable refractory materials, and those compositions are used as a lining material for walls, ceilings and floors of various industrial furnaces.

However, even this new breed of castable refractory compositions having refractory clay as a binder has been found not to be completely free from several problems which are inherent in their own mixtures. This group of castable refractory compositions has refractory clay added in a quantity of up to 20% by weight, and therefore the permeability of the cast structure is extremely low. This often causes explosive spalling during the heat-drying process due to the difficulty the water vapor has in escaping. In order to prevent such explosive spalling, the form must be removed after the cast structure sets, then the structure must be cured for 24 hours or more, and thereafter it must be further subjected to a fixed heat-drying schedule for a considerably long time.

This long installation time is prolonged particularly in winter (it takes 48 hours or more until the removal of the form), because the coagulation action of the refractory clay and coagulant, which is the key action for the curing process, is lowered a great deal in winter. Furthermore, an additional problem of this new breed of refractory composition having refractory clay as a binder is that the strength of the installed structure is extremely low immediately after the removal of the form, so that it becomes necessary to use special care in handling the cast structure.

The purpose of the present invention is to solve the above-mentioned problems of the new breed of castable refractory compositions using refractory clay as a binder.

That is, the present invention provides monolithic refractory compositions for lining various smelting and other industrial furnaces, molten metal containers and the like, comprising the following ingredients:

| | |
|---|---|
| refractory clay: | 3 – 12% by weight |
| metallic aluminum powder (purity = 90% or higher; particle size = 0.074mm or less for 50% or more by weight of the aluminum powder): | 0.1 – 5.0% by weight |
| deflocculating agent: | a minor quantity |
| coagulant: | a minor quantity |
| reaction inhibitor for aluminum powder: | to be added optionally in a quantity from 0.0 to 0.5% by weight |
| refractory aggregate with particle size adjusted: | balance |

Examples of the refractory aggregates used in this invention include clay-chamotte (prepared by firing flint clay and other clays), bauxite, aluminous shale, kyanite, sillimanite, sintered alumina, electrically fused alumina, synthetic mullite, sea water magnesia clinker, magnesite clinker, zircon, fused silica, artificial graphite, chromite, silicon carbide, silicon nitride and the like.

The refractory clay used in this invention is relatively coarse, white, less plastic kaolin type residual clay, which is judged to give good fluidity and high refractoriness to the installed structure. If the quantity of the refractory clay added is larger than 12.0% by weight, the viscosity of the refractory material composition mixed with water becomes too high to cast satisfactorily and the hot properties are deteriorated. On the other hand, if the quantity of the refractory clay added is smaller than 3.0% by weight, the strength of the cured material is not fully developed from a lower temperature zone to a higher temperature zone.

The effect of the addition of metallic aluminum powder is described hereinafter. When metallic aluminum powder is added to the refractory material composition mixed with water, the following reaction takes place.

$$Al + 3H_2O \rightarrow Al(OH)_3 + 3/2\, H_2 \uparrow \qquad (1)$$

As can be seen from the above reaction formula (1), a part of the water is decomposed into aluminum hydroxide and hydrogen gas.

When the above reaction is initiated, the coagulation of the clay is accelerated by the heat generated in the reaction and the clay hardens along with the evaporation of water. Both the reaction initiation time and the quantity of hydrogen generated are closely related to (a) the purity and (b) the particle size and (c) the quantity of the metallic aluminum powder used. That is, (a) in case the purity of aluminum powder is lower than 90%, the reaction initiation time is retarded on a large scale (b) in case the particles with a particle size of 0.074mm or less are less than 50% by weight of the metallic aluminum powder, the reaction initiation is retarded and the strength of the cured structure is lowered, and (c) in case the quantity of metallic aluminum powder added is less than 0.1% by weight of the total composition, the cast structure often suffers explosive spalling when subjected to rapid heat-drying, and in case the quantity added is more than 5% by weight, a large quantity of hydrogen is generated and the expansion of the cast structure becomes considerable, resulting in many cracks and the deterioration of the strength. The addition of metallic aluminum powder within the above mentioned range from 0.1 to 5.0% prevents the explosive spalling during the rapid heat-drying. Although the mechanism of preventing the explosive spalling is not clear, it is considered that the prevention is made possible by the decrease in water content by heat-generation and the rise in permeability by gas-generation, both occurring during the curing process.

The purpose of the addition of a reaction inhibitor is to retard the initiation of hydrogen gas generation as shown in the above formula (1) and to slowly generate the gas after coagulation of the clay binder in order to prevent the foaming of the cast structure, although, if the expansion of the cast structure by foaming is sufficiently small, the addition of the reaction inhibitor is not necessary. Examples of an organic reaction inhibitor which can be used in the present invention include high molecular compounds such as fumines, amines, imines, nitrile compounds, gelatin, gum arabic, sodium alginate and the like, citric acids, oxalic acid, tiron and the like. Examples of an inorganic reaction inhibitor include boric acid, ammonium borate, ammonium fluoride, pyrophosphate, sodium silicate and the like. According to our experiments, ammonium borate was most effective among the above listed reaction inhibitors. The quantity of the reaction inhibitor added is up to 0.5% by weight at maximum. If the quantity of the reaction inhibitor added is larger than 0.5% by weight, it takes a very long time to complete curing of the composition and there is a strong possibility of causing explosive spalling when the cast structure is dried immediately after the removal of the form, because the reaction of the above formula (1) is delayed too much.

In addition to the above additives, a deflocculating agent and a coagulant are added to the refractory compositions of this invention for the following reasons.

In order to give an appropriate fluidity to a mixture of refractory aggregate and clay, it is necessary to add a large quantity of water to the mixture because the viscosity of clay is very high. However, such addition of a large quantity of water brings large shrinkage of the cast structure after the removal of the form, which often becomes the cause of cracks. Therefore it is necessary to secure the appropriate fluidity with a minimum quantity of water, and the deflocculating agent is added in order to minimize the quantity of water while securing the appropriate fluidity. The quantity of the deflocculating agent added is 0.01–1.0% by weight. Examples of a deflocculating agent which can be used in the present invention include sodium humate, sodium silicate, sodium pyrophosphate, sodium oxalate, sodium tannate and the like.

After the casting, the refractory composition should preferably be coagulated within a short period of time so that the form can be removed in a short time. A coagulant is added in order to accelerate the coagulation of the composition. The amount of the coagulant added is 1–8% by weight. Examples of a coagulant which can be used in the present invention include $Ca(OH)_2$, $CaO$, $CaCO_3$, $CaSO_4$-$\frac{1}{2}$ $H_2O$, $CaSO_4$-$2H_2O$, calcium aluminate, calcium silcate, calcium chromate, calcium fluoride, calcium silicofluoride and the like. It takes some time before the calcium ions ($Ca^{+2}$) of these coagulants are dissolved out and the coagulating action shows. That is, after the casting of the composition having an appropriate fluidity as a result of the deflocculating action, the coagulant works. Thus, it can be said that the reaction initiation of coagulating action for the compositions of the present invention is designed to come after the completion of deflocculating action.

The embodiment of this invention is described hereinafter. A mixture of refractory clay, refractory aggregate, metallic aluminum powder, reaction inhibitor, deflocculating agent and coagulant in the above-mentioned ratios is mixed with water, and the resultant mixture is cast in a form. The form can be removed 2–8 hours after the casting. The cast product is then subjected to curing during which the reaction as expressed by the formula (1) takes place and generates heat. Due to this heat-generation, the temperature of the composition rises to 100° C. The heat-generation continues for 3–8 hours during which 60–70% by weight of the water content in the composition is removed. Thus, this internal heat-generation gradually removes the water content in the composition and dries the composition in 3–8 hours, thereby raising the coagulating force of the refractory clay and increasing strength to the level of the ordinary drying strength at 110° C. Since the coagulation of the refractory clay gradually proceeds internally by the internal drying mechanism, the cast structure does not suffer any internal stress or distortion. This is one of the reasons why the explosing spalling does not occur during rapid drying.

The total length of time from initiation to completion of the heat-generation reaction should preferably be less than 24 hours when the refractory composition is used for lining smelting furnaces or other industrial furnaces and molten metal containers. One of the essential features of this invention is that the removal of the form and the heat-generation reaction can be finished within 24 hours from the casting step and the resulting product can be immediately subjected to heat-drying. According to the present invention, it is not necessary to subject the composition to drying carefully at a low temperature (400° C. or less), which was necessary in the case of the earlier type of refractory compositions containing refractory clay as a binder. The refractory compositions of the present invention can be immediately subjected to rapid heat-drying at 500°–800° C. without suffering any explosive spalling, so that the operation can be done in a short time.

In the case of the conventional hydraulic castable refractory compositions containing alumina cement as a binder and the earlier type of refractory compositions containing refractory clay as a binder, strength is remarkably deteriorated when subjected to rapid heat-drying, but the refractory compositions of this invention assure strength to the same degree as the ordinary firing strength which is obtained by slow, gradual heating, without suffering any such disadvantages.

The present invention is more fully illustrated by the following Examples.

|  | The Refractory Composition of This Invention | | | | | Earlier type of clay-bonded castable compositions |
| --- | --- | --- | --- | --- | --- | --- |
|  | 1 | 2 | 3 | 4 | 5 |  |
| Composition (%) |  |  |  |  |  |  |
| clay-chamotte (coarse particle) | 50 | 50 | 50 | 50 | 50 | 50 |
| clay-chamotte (medium particle size) | 20 | 20 | 20 | 20 | 20 | 20 |
| alumina fine powder | 10 | 10 | 10 | 10 | 10 | 10 |
| refractory clay | 10 | 10 | 10 | 10 | 10 | 10 |

-continued

|  | The Refractory Composition of This Invention | | | | | Earlier type of clay-bonded castable compositions |
|---|---|---|---|---|---|---|
|  | 1 | 2 | 3 | 4 | 5 |  |
| deflocculating agent (sodium humate) | 0.2 | 0.2 | 0.2 | 0.2 | 0.2 | 0.2 |
| coagulant (calcium aluminate) | 1.5 | 1.5 | 2.0 | 2.0 | 2.0 | 2.0 |
| Al powder | 0.5 | 1.0 | 2.0 | 2.5 | 5.0 | — |
| reaction inhibitor (ammonium borate) | 0.01 | 0.05 | 0.1 | 0.2 | 0.5 | — |
| Water (%) Addition* | 10.0 | 10.0 | 10.0 | 10.0 | 10.5 | 10.0 |
| Setting Time (hrs) | 3 | 5 | 8 | 10 | 15 | 8 |
| Heat-generation reaction time (hrs) | 4 | 8 | 15 | 22 | 24 | — |

*shown in percentage of the weight of the dry material

| Physical Properties | The Refractory Composition of This Invention | | | | | Earlier type of clay-bonded castable compositions |
|---|---|---|---|---|---|---|
|  | 1 | 2 | 3 | 4 | 5 |  |
| bulk specific gravity |  |  |  |  |  |  |
| after curing 24 hrs | 2.18 | 2.19 | 2.19 | 2.20 | 2.18 | 2.22 |
| after drying at 110° C | 2.17 | 2.17 | 2.17 | 2.18 | 2.17 | 2.17 |
| after firing at 1000° C | 2.09 | 2.10 | 2.10 | 2.11 | 2.10 | 2.08 |
| bending strength (kg/cm$^2$) |  |  |  |  |  |  |
| after curing 24 hrs | 10 | 13 | 18 | 25 | 30 | 5 |
| after drying at 110° C | 15 | 20 | 20 | 26 | 32 | 12 |
| after firing at 1000° C | 20 | 25 | 28 | 30 | 30 | 20 |
| apparent porosity (%) |  |  |  |  |  |  |
| after drying at 110° C | 22.0 | 22.5 | 21.9 | 22.2 | 21.3 | 22.6 |
| after firing at 1000° C | 24.5 | 23.9 | 24.3 | 24.7 | 23.7 | 24.7 |
| Explosive-spalling test The occurrence of explosive spalling was checked after curing a test piece of 40×40×160mm for 24 hours and then heating it at a temperature of 800° C for 10 minutes.) | no explosive spalling | no explosive spalling | no explosive spalling | no explosive spalling | no explosive spalling | explosive-spalling into small pieces |
| Strength after explosive-spalling test (kg/cm$^2$) |  |  |  |  |  |  |
| bending strength | 23.5 | 25.0 | 27.7 | 35.5 | 37.9 | — |
| compressive strength | 100 | 125 | 150 | 225 | 280 | — |

As can be seen from the above Examples, the present invention provides excellent castable refractory compositions solving problems of the earlier type of refractory castable compositions containing refractory clay as a binder. That is, the refractory compositions of this invention have a high strength after curing and do not suffer explosive spalling when subjected to rapid heat-drying. Thus, when such corrosion-resistant material as electrically fused alumina, sintered alumina, magnesia clinker, silicon carbide, silicon nitride and the like is used as an aggregate, the refractory compositions of this invention can be satisfactorily used in casting for lining smelting furnaces or other industrial furnaces, and/or molten metal containers, which are directly exposed to molten slag, molten steel, molten iron and the like.

What we claim is:

1. Monolithic castable refractory compositions used for lining various smelting furnaces or other industrial furnaces, molten metal containers and the like, comprising the following ingredients:

| refractory clay: | 3 – 12% by weight |
|---|---|
| metallic aluminum powder (purity = 90% or higher; particle size = 0.074mm or less for 50% or more by weight of the aluminum powder): | 0.1 – 5.0% by weight |
| deflocculating agent: | 0.01 ~ 1.0% by weight |
| coagulant: | 1 ~ 8% by weight |
| reaction inhibitor for aluminum powder: | to be added in a quantity from 0.0 to 0.5% by weight |
| refractory aggregate with particle size adjusted: | balance |

* * * * *